US008401240B2

(12) United States Patent
Dixon et al.

(10) Patent No.: US 8,401,240 B2
(45) Date of Patent: Mar. 19, 2013

(54) PASSIVE SINGLE CAMERA IMAGING SYSTEM FOR DETERMINING MOTOR VEHICLE SPEED

(75) Inventors: Warren E. Dixon, Gainesville, FL (US); Nicholas R. Gans, Gainesville, FL (US); Sumit Gupta, New York, NY (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 727 days.

(21) Appl. No.: 12/447,782

(22) PCT Filed: Nov. 7, 2007

(86) PCT No.: PCT/US2007/083895
§ 371 (c)(1),
(2), (4) Date: Jan. 7, 2010

(87) PCT Pub. No.: WO2008/060916
PCT Pub. Date: May 22, 2008

(65) Prior Publication Data
US 2010/0111365 A1 May 6, 2010

Related U.S. Application Data

(60) Provisional application No. 60/865,032, filed on Nov. 9, 2006.

(51) Int. Cl.
*G06K 9/00* (2006.01)
(52) U.S. Cl. .................................. 382/107; 382/104
(58) Field of Classification Search .................. 382/104, 382/107
See application file for complete search history.

(56) References Cited

U.S. PATENT DOCUMENTS

| | | | |
|---|---|---|---|
| 2003/0053658 A1* | 3/2003 | Pavlidis | 382/103 |
| 2004/0096084 A1* | 5/2004 | Tamoto et al. | 382/104 |
| 2004/0183905 A1* | 9/2004 | Comaniciu et al. | 348/148 |
| 2005/0163343 A1* | 7/2005 | Kakinami et al. | 382/103 |
| 2006/0222209 A1* | 10/2006 | Zhang et al. | 382/107 |

* cited by examiner

Primary Examiner — John Strege
(74) Attorney, Agent, or Firm — Thomas | Horstemeyer, LLP

(57) ABSTRACT

A system for passively determining a speed of moving vehicles includes a single imaging device (103) for acquiring a plurality of images at a first time and at least at one second later time, wherein each image includes a moving vehicle (406) on a vehicle pathway (402) and at least one fixed object (404) proximate to the vehicle, defining a first plane ($\pi_1$) intersecting an adjacent portion of the vehicle pathway (402), wherein no geometric lengths of the vehicle (406) are known a priori. The system can also include a processor (121) operable to receive data associated with the images and determine a speed of the vehicle (406) in the images, wherein the processor (121) estimates at least one geometric length of the vehicle (406) by applying homography using the plurality of images, and where the processor (121) determines a speed of the vehicle (406) from the plurality of images and the estimated geometric length using a velocity estimation method.

22 Claims, 6 Drawing Sheets

PASSIVE SINGLE CAMERA IMAGING SYSTEM FOR DETERMINING MOTOR VEHICLE SPEED

CROSS REFERENCE TO RELATED APPLICATION

This application claims priority to "Passive Single Camera Imaging System for Determininq Motor Vehicle Speed," having serial number PCT/US2007/083895, filed on Nov. 7, 2007. This application also claims priority to and benefit of U.S. Provisional Application No. 60/865,032, filed on Nov. 9, 2006, which is incorporated by reference in its entirety.

FIELD OF THE INVENTION

This invention relates to systems and methods for determining the speed of motor vehicles, and more specifically to using passive imaging for determining the speed of motor vehicles.

BACKGROUND

The determination of motor vehicle speed is important to ensure motorist compliance with posted speed limits. Compliance with posted speed limits is recognized as critical for public safety. In general, vehicle speed detection has been based on radar gun systems. Radar guns typically use the emission and detection of reflected electromagnetic waves from the object being interrogated. The relative velocity of the object can then be determined by the Doppler effect on the reflected waves due to the vehicle's motion. The Doppler effect shifts the frequency of the radar reflection based on the relative velocity (speed) of the "target", allowing for the direct and generally accurate measurement of speed of a moving vehicle.

However, there are some known problems with radar guns. First, for speed to be accurately calculated, the moving object of interest should be the only moving object in the beam path of the radar gun. If this is not the case, it is impossible to determine which object's speed the system is reading. Second, the incident angle of the beam path of the radar gun to the object can also affect the measurement. This includes angles on a horizontal and vertical planes. Third and perhaps most importantly, the active electromagetic emissions required in such systems, even in the case of laser emitting systems, can be detected by commerically available radar detectors procured by motorists purposefully trying to evade speed limit enforcement efforts.

Some have suggested use of a passive system one or more cameras, without an electromagnetic wave emission source, to determine the velocity of a moving object. However, the use of a camera images generally requires interpretation of the motion of a 3-dimensional (3D) object through 2-dimensional (2D) images provided by the camera. However, a primary problem with such an approach is that the 3D information of the vehicle is projected or nonlinearly transformed into 2D information. Hence, techniques or methods are needed to obtain 3D information despite the fact that only 2D information is available.

In one suggested method, as disclosed in "Identification of a moving object's velocity with a fixed camera", by Chitrakaran et al., Automatica 41 (2005) 553-562, if a geometric length of a moving object is known, camera images from a single camera can be used to estimate the object's velocity, provided the initial position and orientation of the object is known a priori. However, because this method requires knowledge or an accurate estimate of a geometric length of the object, as well as the initial position and orientation of the object, this method does not permit images from a single camera to be used to determine an unknown or a random object's velocity with sufficient accuracy to be useful for vehicle speed detection applications.

Another disclosed passive system for measuring vehicle speeds is based on a system that requires image data from two cameras. U.S. Pat. No. 6,675,121, to Hardin et al., discloses a passive electro-optical range and total velocity measuring system having first and second cameras positioned along a common baseline. Control systems activate the first and second cameras at a first instance to capture a target image of a target at location T1 and at a second instance to capture a target image of the target at location T2. A range computer calculates ranges from the first camera, the second camera, and a baseline midpoint to a target at location T1 and location T2. An angles computer calculates target displacement. A velocity computer calculates total target velocity, track velocity, and cross-track velocity.

Although the Hardin system provides the advantage of being an undetectable speed measuring system as compared to convention emission based radar systems, the Hardin system is not readily mobile and requires two separate cameras for operation. Therefore, what is needed is a passive single camera speed detection system that is preferably adapted for mobility.

SUMMARY OF THE INVENTION

In a first embodiment of the present invention, an imaging system for passively determining a speed of moving vehicles can include a single imaging device for acquiring a plurality of images at a first time and at least at one second later time, where each of the images includes the moving vehicle on the vehicle pathway and at least one fixed object proximate to the moving vehicle defining a first plane which intersects an adjacent portion of the vehicle pathway, and where no geometric length of the vehicle is known a priori. The system can also include a processor operable to receive data associated with the plurality of images and determine a speed of the moving vehicle in the images, where the processor estimates at least one geometric length of the vehicle based on applying homography using the plurality of images of the vehicle at the first and the at least one second later time, and where the processor determines a speed of the moving vehicle using the plurality of images and the geometric length.

In a second embodiment of the present invention, a method for passively determining a speed of moving vehicles can include the step of acquiring a plurality of images a first time and at least at one second later time using a single imaging device, where each of the images includes the moving vehicle on the vehicle pathway and at least one fixed object proximate to the moving vehicle defining a first plane which intersects an adjacent portion of the vehicle pathway and where no geometric length of the vehicle is known a priori. The method can also include the steps of estimating at least one geometric length of the vehicle based on applying homography using the plurality of images of the vehicle at the first and the at least one second later time and determining a speed of the moving vehicle using the plurality of images and the geometric length.

BRIEF DESCRIPTION OF THE DRAWINGS

These and other features, aspects, and advantages of the present invention will become better understood when the following detailed description is read with reference to the accompanying drawing in which like characters represent like parts throughout the drawing, wherein.

DETAILED DESCRIPTION

Figure 1A:
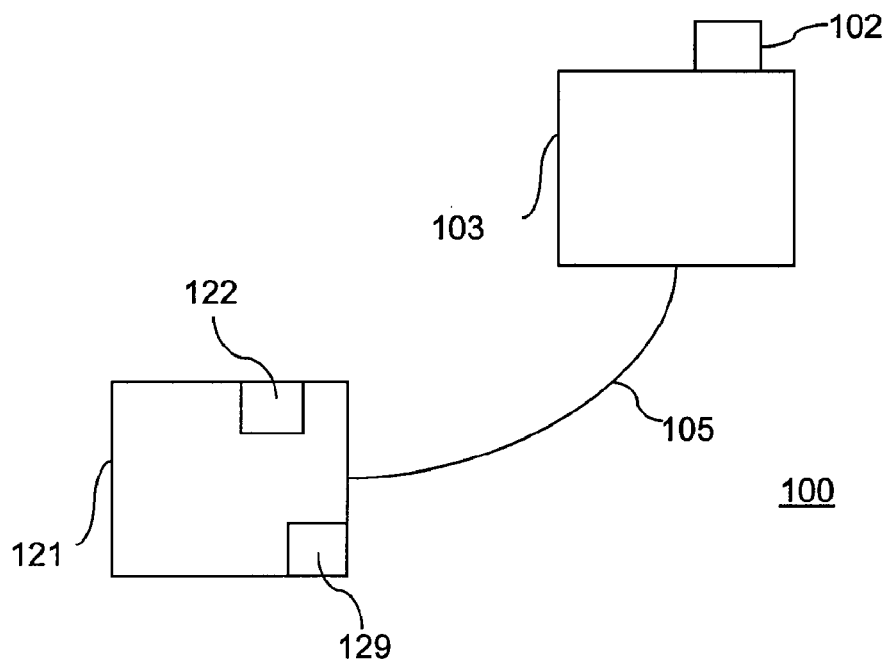
FIG. 1A shows a block diagram of a wireline single camera passive imaging system for determining motor vehicle velocity according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

Embodiments of the present invention provide a passive imaging system for determining motor vehicle speeds which comprises a single imaging device for obtaining a plurality of images associated with a plurality of different views of a motor vehicle. Although the exemplary embodiments described herein refer to systems for determining the scalar quantity speed, other embodiments of the invention can more generally provide the related vector quantity velocity, upon which measures useful in certain applications, such as angular velocity, can be derived. As used and claimed herein, the term "single camera" or "single imaging device" refers to only one (1) imaging device configured to collect a single image at a time. Although, single cameras can include digital and non-digital still cameras, the invention is equally applicable to any system including a digital or non-digital motion cameras. In such embodiments, the images acquired can be the individual frames acquired by such motion cameras.

In embodiments of the present invention for determining moving vehicle speeds, the images obtained from the single camera can include various objects in the images, including one or more moving vehicles on a vehicle pathway and a fixed object (e.g. a light pole, a traffic sign, or other fixed non-moving object on near the vehicle pathway) proximate to the vehicle. The fixed object, in some embodiments, can include at least one surface used to define a first plane. In some embodiments, the images can also include an area on the ground defining fixed ground plane. The position and orientation of the fixed ground plane defines a second plane which is not coplanar with the first plane. No geometric length of the moving vehicles is required to be known a priori.

In operation, the passive imaging system can include a processor or related computing device which can be operably coupled to the camera to receive image data associated with the plurality of images. The processor can estimate at least one geometric length of the vehicle based on applying homography using images of the vehicle at a first and at least a second later time. The processor, running an algorithm according to an embodiment of the present invention, can then determine the speed of the vehicle using the plurality of images and the geometric length derived therefrom. The system is exclusive of any energy emission source for determining vehicle velocity and is thus undetectable by speeding motorists having radar detectors and other detection devices that seek to evade detection. Importantly, systems according to the invention are readily portable and require only a single camera.

In embodiments of the present invention, an algorithm can be implemented to operate on a processor or other computing device that uses live video camera footage to recognize objects and measure their velocity, which permits the speed to be determined. The algorithm can calculate the distance a vehicle moves in a series of photos (2 or more) compared to a fixed object proximate to the roadway, such as a light pole or a stop sign, in the background. Because the system is entirely passive, unlike conventional laser and radar speed guns, it cannot be detected by any type of detection devices in a moving vehicle.

Figure 1B:
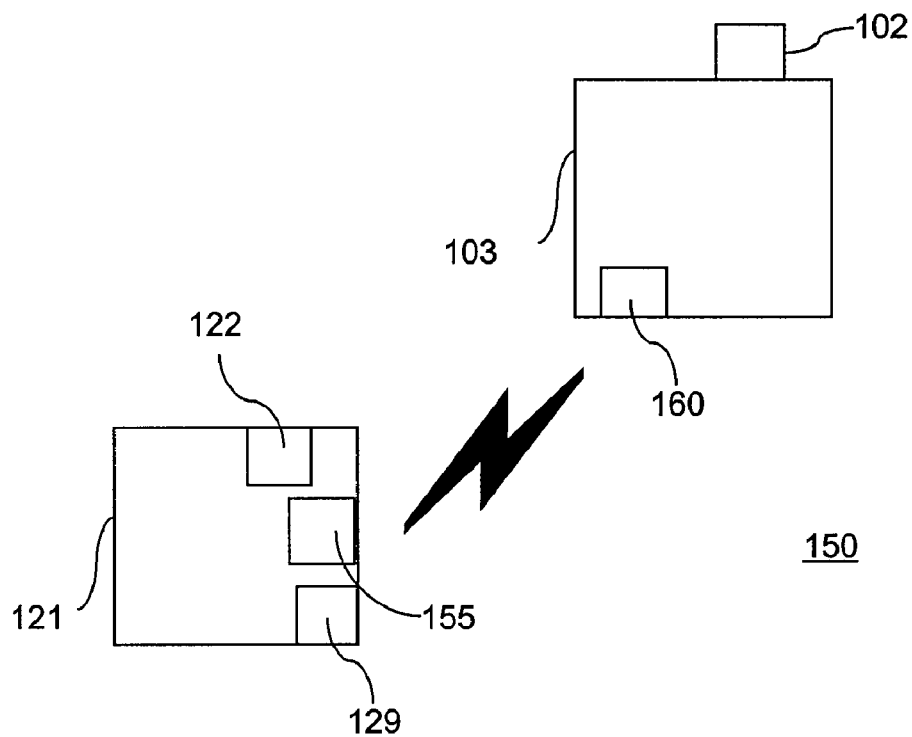
FIG. 1B shows a block diagram of a wireless single camera passive imaging system for determining motor vehicle velocity according to an embodiment of the present invention.
Figure 1C:
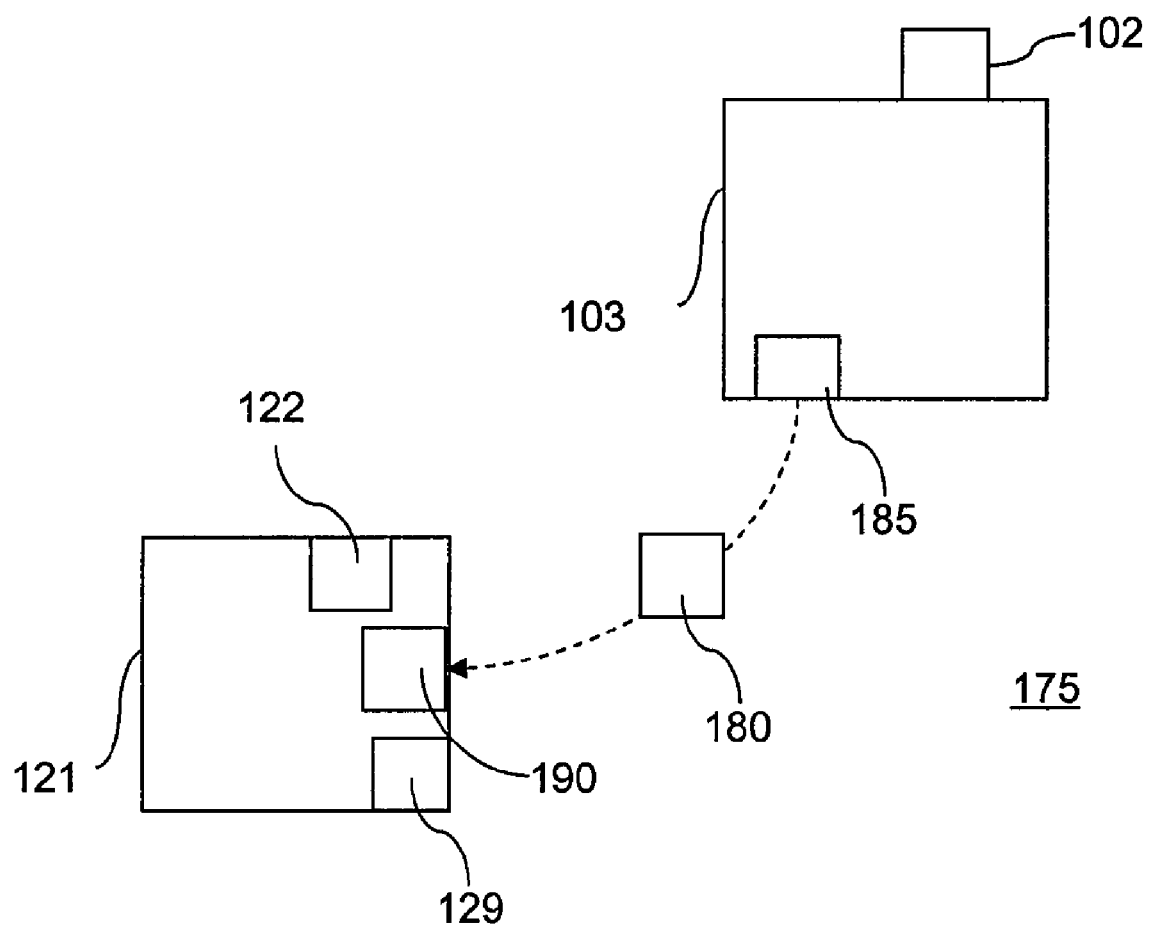
FIG. 1C shows a block diagram of another single camera passive imaging system for determining motor vehicle velocity according to an embodiment of the present invention.

In FIGS. 1A, 1B, and 1C exemplary embodiments of a single camera-based passive imaging systems 100, 150, 175 for determining the speed of motor vehicles according to an embodiment of the invention are illustrated. A system 100, 150, 175 can include a camera 103 for acquiring images having associated optics 102. For example, a CCD camera can be used, although any other type of imaging technologies are equally applicable. As shown in FIG. 1A, a data cable 105 can be used to communicatively link camera 103 to a computer processing module 121 having associated non-volatile memory 129 and display screen 122 for displaying velocity and other information. However, the present invention is not limited to wireline configurations. For example, as illustrated in FIG. 1B, a system 150 can include a camera transceiver 155 which can be used cooperatively with a processor transceiver 160, to communicatively link camera 103 to processing module 121 via wireless communications, such as RF or optical communications. In another example, as illustrated in FIG. 1C, a system 175 can include a removable memory device 180 which can be used cooperatively with removable memory device interfaces 185, 190, to transfer acquired images between camera 103 and the processing module 121.

In some embodiments of the present invention, the computer processing module 121 and display screen 122 can be embodied as a touch screen interface mounted with a laptop, or other computer, for maximum portability.

Camera 104 may generally be any type of electro-optical imaging sensor with a focal length f. In one embodiment, camera includes focal length adjustability, which can be directed by computer processing module 121 (control connection not shown). Each imaging sensor can be, for example, based on charge-coupled device (CCD), a charge-injection device (CID), a metal-oxide-semiconductor (MOS) phototransistors array, or various types of infra-red imaging sensors. Computer processing module 121 may be any type of computer. For example, computer processing module 121 may be a general purpose computer with software according to the invention.

In one embodiment, camera 104 is an infrared camera. Infrared cameras are generally preferred since they do not encounter problems under night or adverse weather conditions. Infrared cameras for use with the present invention do not require an emission source. Such cameras provide gray scale images. In another embodiment, the camera 104 is a conventional camera that includes a color option available to further discriminate target. Data acquired can be time stamped and stored by memory 129.

As noted above, multiple images are required to determine vehicle length, which allows determination of vehicle speed. To obtain multiple images to provide an estimate of vehicle length, in one embodiment the camera 104 is coupled to a structure for moving the camera (not shown). In another embodiment of the invention, the camera 104 is a stationary camera, but includes changeable focal length optics 102. Changeable focal length optics 102 can be controlled by computer 121.

Memory 129 stores software according to the invention which estimates at least one geometric length of a moving vehicle based on applying homography using the plurality of images of the vehicle at a first and a second later time. Such methods can reconstructing a piecewise planar scene viewed by a camera can use Euclidean homography relationships to estimate the position, orientation and size of every static, piecewise planar, object in the field of view captured by the camera. In particular embodiments of the present invention provide using an estimate of the length of a moving object given the information solved for the static objects and known geometrical constraints.

As used herein, "homography" refers to Euclidean Homography which is well known in the computer vision community. Given two images of a set of coplanar points, the Euclidean Homography maps the coordinates of the points in one image to the coordinates in a corresponding image. Given four or more points, the Homography can be solved and decomposed to give the motion that separates the two camera views.

Figure 2A:
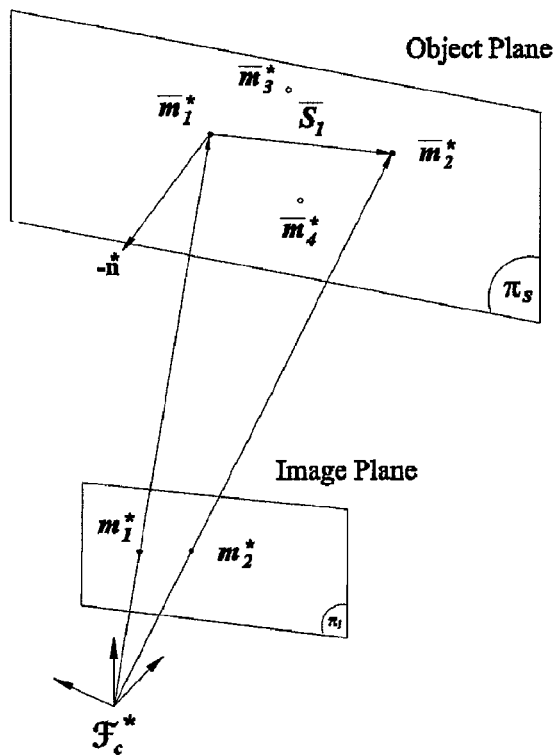
FIG. 2A shows a schematic representation of the projection of planar points in an image plane and in an object plane according to an embodiment of the present invention.

More formally, consider a camera with reference frame $F^*_c$ as shown in FIG. 2A. The camera views a collection of $k \geq 4$ feature points lying in a plane $\pi_s$ in front of the camera. These points have coordinates $$\overline{m}^*_j = [x^*_j, y^*_j, z^*_j]^T, \forall j \in \{1 \ldots k\}$$

in the camera reference frame. An image of the points is captured, resulting in a projection to a set of points in the image plane $\pi_i$. These image points are given by the normalized coordinates $$\overline{m}^*_j = [x^*_j, y^*_j, z^*_j]^T, j \in \{1 \ldots k\}$$

By moving the camera (similarly, moving $\pi_s$) by a translation x(t) and rotation R(t), the camera will obtain a new pose $F_c(t)$. The points now have Euclidean and normalized coordinates $$\overline{m}_j(t) = [x_j(t), y_j(t), z_j(t)]^T, \forall j \in \{1 \ldots k\}$$

$$m_j(t) = \left[\frac{x_j(t)}{z_j(t)}, \frac{y_j(t)}{z_j(t)}, 1\right]^T, \forall j \in \{1 \ldots k\}$$

in the new frame. A homography exists that maps $m^*_j$ to $m_j(t)$. This homography can be defined as $H(t) \in R^{3 \times 3}$ such that $$m_j = \frac{z^*_j}{z_j}\left(R + \frac{x}{d^*}n^{*T}\right)m^*_j$$

$$m_j = \alpha H m^*_j.$$

Where d* defines the distance from the object plane to the camera frame and n* defines a normal to the plane $\pi_s$ in $F^*_c$. Methods for solving for H, and for recovering $$R(t), \frac{x(t)}{d^*},$$

n* and the ratios $$\alpha_j = \frac{z^*_j}{z_j}$$

are well-known to those of ordinary skill in the art. For example, epipolar geometry methods can be used to solve for H.

In order to solve for the position and orientation of a body rigidly attached to the plane $\pi_s$, in the reference frame $F^*_c$, this can require assigning a reference frame $F_s$ to the plane and finding the rotation matrix R* and translation vector x* which relate $F^*_c$ to $F_s$. Fs is defined by three orthonormal vectors $i_x$, $i_y$, and $i_z$, all elements of $\mathcal{R}^3$. The matrix R* is composed of the coordinates of $i_x$, $i_y$, and $i_z$ in $F^*_c$:

$$R^* = [i_x, i_y, i_z].$$

Without loss of generality, the origin of Fs is assigned to the feature point $\overline{m}^*_1$. Next, $i_z$ is assigned:

$$i_z = -n^*.$$

and $i_x$ is assigned as:

$$i_x = \frac{\overline{m}^*_2 - \overline{m}^*_1}{\overline{s}_1},$$

which is the unit vector between points $\overline{m}^*_2$ and $\overline{m}^*_1$. Accordingly, by definition, $$i_y = -n^* \times \frac{\overline{m}^*_2 - \overline{m}^*_1}{\overline{s}_1}$$

However, if the camera motion includes a translation, we can solve for n* using the equation above for $m_j$. Thus, $i_z$ can solved. Furthermore, if $\overline{s}_1$ is known, unknowns $\overline{m}^*_2$ and $\overline{m}^*_1$ can be solved from the measurable values of $m^*_1$ and $m^*_2$, allowing $i_x$ and $i_y$ to also be solved.

Figure 2B:
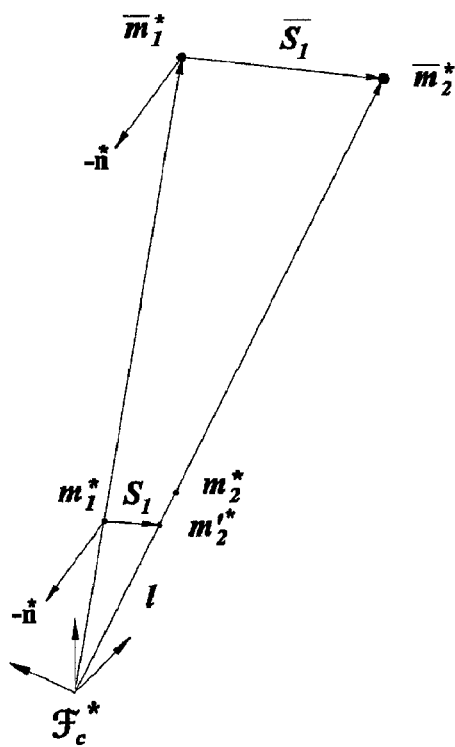
FIG. 2B shows a geometric reconstruction of the planar points in an image plane and in an object plane of FIG. 2A according to an embodiment of the present invention.

To solve for $\overline{m}^*_2$ and $\overline{m}^*_1$ a new plane $\pi'_s$ with normal $-n^*$ (so that $\pi'_s$ is parallel to $\pi_s$) and containing the point $\overline{m}^*_1$ can be defined. A line l can then be defined from the origin of $F^*_c$ through $m^*_2$ and $\overline{m}^*_2$. The plane $\pi'_s$ intersects l at a point $m'^*_2$. The distance between $m^*_1$ and $m'^*_2$ is $s_1$. This is illustrated in FIG. 2B.

The primitives l and $\pi'_s$ can then be defined by the sets of points p that satisfy the implicit functions:

$$l=\{p|p-um^*_2=0, \forall u \in R\}, \text{ and}$$

$$\pi'_s=\{p|n^*\cdot(p-m^*_1)=0\}.$$

The intersection of $\pi'_s$ and l occurs when:

$$u = \frac{n^* \cdot m^*_1}{n^* \cdot m^*_2}.$$

Accordingly, $m'^*_2$ can then be solved for and results in:

$$m'^*_2 = \frac{n^* \cdot m^*_1}{n^* \cdot m^*_2} m^*_2.$$

The solution of $m'^*_2$ can then be used to solve for $s_1$ as:

$$s_1 = \|m'^*_2 - m^*_1\|,$$

and by the properties of similar triangles it is true that:

$$\frac{s_1}{\overline{s}_1} = \frac{\|m^*_1\|}{\|\overline{m}^*_1\|} = \frac{\|m^*_2\|}{\|\overline{m}^*_2\|}.$$

Therefore, with $s_1$, $\overline{s}_1$, $\|m^*_1\|$, and $\|m^*_2\|$ known or measurable, $\|\overline{m}^*_2\|$ and $\|\overline{m}^*_2\|$ can be solved for and the values for $\overline{m}^*_2$ and $\overline{m}^*_1$ can be recovered as:

$$\overline{m}^*_1 = \frac{\|\overline{m}^*_1\|}{\|m^*_1\|} m^*_1,$$

and $$\overline{m}^*_2 = \frac{\|\overline{m}^*_2\|}{\|m^*_2\|} m^*_2,$$

allowing $i_x$, $i_y$, and $R^*$ to be solved using the equations described above. Since $F_s$ is attached to $\overline{m}^*_1$, $x^* = \overline{m}^*_1$. Note that by repeating the above process using $H^{-1}$, the position and orientation of $\pi s$ with respect to the current camera frame $F_c$ can then be found.

Once $\overline{m}^*_1$ has been solved, it is then possible to solve for the distance $d^*$. The distance is measured in the direction of the normal $n^*$ from the origin of $F_c$ to $\pi_s$. The implicit equations for $\pi_s$ and the shortest line, $l_d$, form the origin of $F_c$ to $\pi_s$ can then be given by $$l_d=\{p|p-un^*=0, \forall u \in R\}, \text{ and}$$

$$\pi_s=\{p|n^*\cdot(p-\overline{m}^*_1)=0\}.$$

The intersection occurs when:

$$u = d^* = \frac{n^* \cdot \overline{m}^*_1}{n^* \cdot n^*} n^* \cdot \overline{m}^*_1$$

Again, performing these steps using $H_{-1}$ gives the distance d from the origin of the current camera frame $F_c$ to $\pi_s$.

With $d^*$ solved and $m^*_j$, $j \in \{1 \ldots k\}$ measurable, it is possible to solve for the 3D coordinates in $F^*_C$ of all points $\overline{m}^*_j = [x^*_j, y^*_j, z^*_j]^T$, $j \in \{1 \ldots k\}$, where $$d^* = n^* \cdot \overline{m}^*_j = n^* \cdot m^*_j z_j$$

and $$z_j = \frac{d^*}{n^* \cdot m^*_j},$$

resulting in:

$$\overline{m}^*_j = z_j \overline{m}^*_j = \frac{d^*}{n^* \cdot m^*_j} m^*_j$$

One again, using $H^{-1}$ can gives the coordinates of all points in current camera frame $F_c$.

The methods discussed above can then be extended to the case of multiple rigidly connected planar patches and piecewise planar objects. Note that static objects in a scene are essentially rigidly connected. Therefore, consider a large sample of points P visible to the camera. These points can be grouped into m sets of coplanar points $P_h \subset P$, $h \in \{1 \ldots M\}$, where all points in $P_h$ lie in a plane $\pi_h$. The sets $P_h$ can overlap, i.e. a point can be in more than one set. Further, the sets can be distinguished through scene knowledge (e.g., multiple objects on a common background) or various algorithms (e.g., searching for parallel lines on building faces). In these cases, each set $P_h$ can be well posed in the sense that it contains no more than three colinear points.

Figure 3:
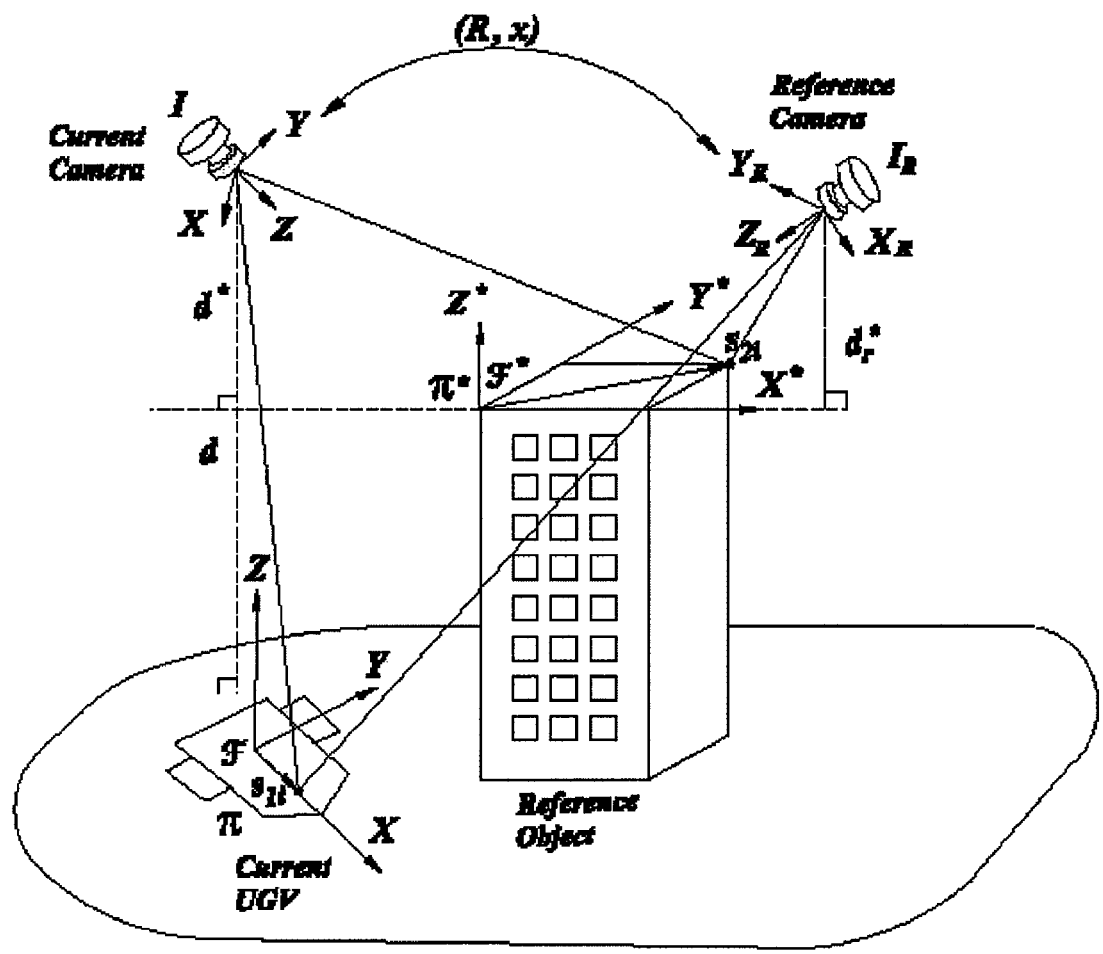
FIG. 3 depicts an exemplary arrangement for passively determining a geometric length of an object according to an embodiment of the present invention.

For example, as shown in FIG. 3, a camera can undergo rotation R and translation x from a reference frame $F_c$ to a frame $F^*_c$. The points in each set $P_h$ can have coordinates $\overline{m}^*_{hj} = [x^*_{hj}, y^*_{hj}, z^*_{hj}]^T$, $j \in \{1 \ldots k_h\}$, $h \in \{1 \ldots m\}$ in the frame $F^*_c$ and coordinates $\overline{m}_{hj} = [x_{hj}, y_{hj}, z_{hj}]^T$, $j \in \{1 \ldots k_h\}$, $h \in \{1 \ldots m\}$ in the frame $F_c$. These points project to image points with coordinates $m^*_{hj}$ and $m_{hj}$ as previously described. Each set of points in the two images can then be related by a homography $H_h$ defined by:

$$m_{hj} = \frac{z^*_{hj}}{z_{hj}} H_h m^*_{hj} = \frac{z^*_{hj}}{z_{hj}} \left( R + \frac{x}{d^*_h} n^{*T}_h \right) m^*_{hj}.$$

Note that $H_h$, $d^*_h$, and $n^*_h$ are different for each set of points Ph, but R and x are the same for all h.

Therefore, from $m^*_{hj}$ and $m_{hj}$ one can recover $H_h$, $n^*_h$, R, and $$x_h = \frac{x}{d^*_h}$$

for all $h \in \{1 \ldots m\}$. First, one can assume that a single geometric length between two points in a single set is known. Further, without a loss of generality, once can assume this length is known in set $P_1$. Given this geometric length, one can attach a reference frame $F_{s1}$ to a plane $\pi_1$ and solve for $R^*_h$, $x^*_1$, $d^*_1$, and $\overline{m}^*_{1j}$ for all $j \in \{1 \ldots k_1\}$ as previously described. Therefore, from $d^*_1$, x can be recovered as:

$$x = d^*_1 x_1.$$

Given x, one can then recover each $d^*_h$, $h \in \{2 \ldots m\}$:

$$d^*_h = \frac{x}{x_h}$$

Subsequently, using each $d^*_h$, one can then recover all $\overline{m}^*_{hj}$, $j \in \{1 \ldots k_1\}$, $h \in \{2 \ldots m\}$ as previously described. Using the now known values of $\overline{m}^*_{hj}$, frames $F_{sh}$ can be attached to plane $\pi_h$ and $R^*_h$, and $x^*_h$, $h \in \{2 \ldots m\}$ can be solved. Combined with the rotation and translation from each plane $\pi_h$ to the reference camera frame $F^*_c$, one can then recover the rotation and translation between each planar patch in the reference frame. Performing the above analysis with $H_h^{-1}$ can then give all such relations in the current camera frame and at the current time.

For a single camera viewing multiple moving planar objects, the analysis cannot be performed as there is not a common R or x. In other words, unless a geometric length is known on each object, it will not be possible to reconstruct values for moving objects using these techniques. Although the methods described above can be used to estimate the position, orientation, and size of every static, piecewise-planar object in a field of view in an image, they cannot recover the position or size of a moving piecewise planar object if at least one geometric length is not known on that object. Embodiments of the present invention provide for estimating such a length provided that information can be determined for static objects in the images, such as in the case of observing a moving vehicle on a vehicle pathway.

Figure 4:
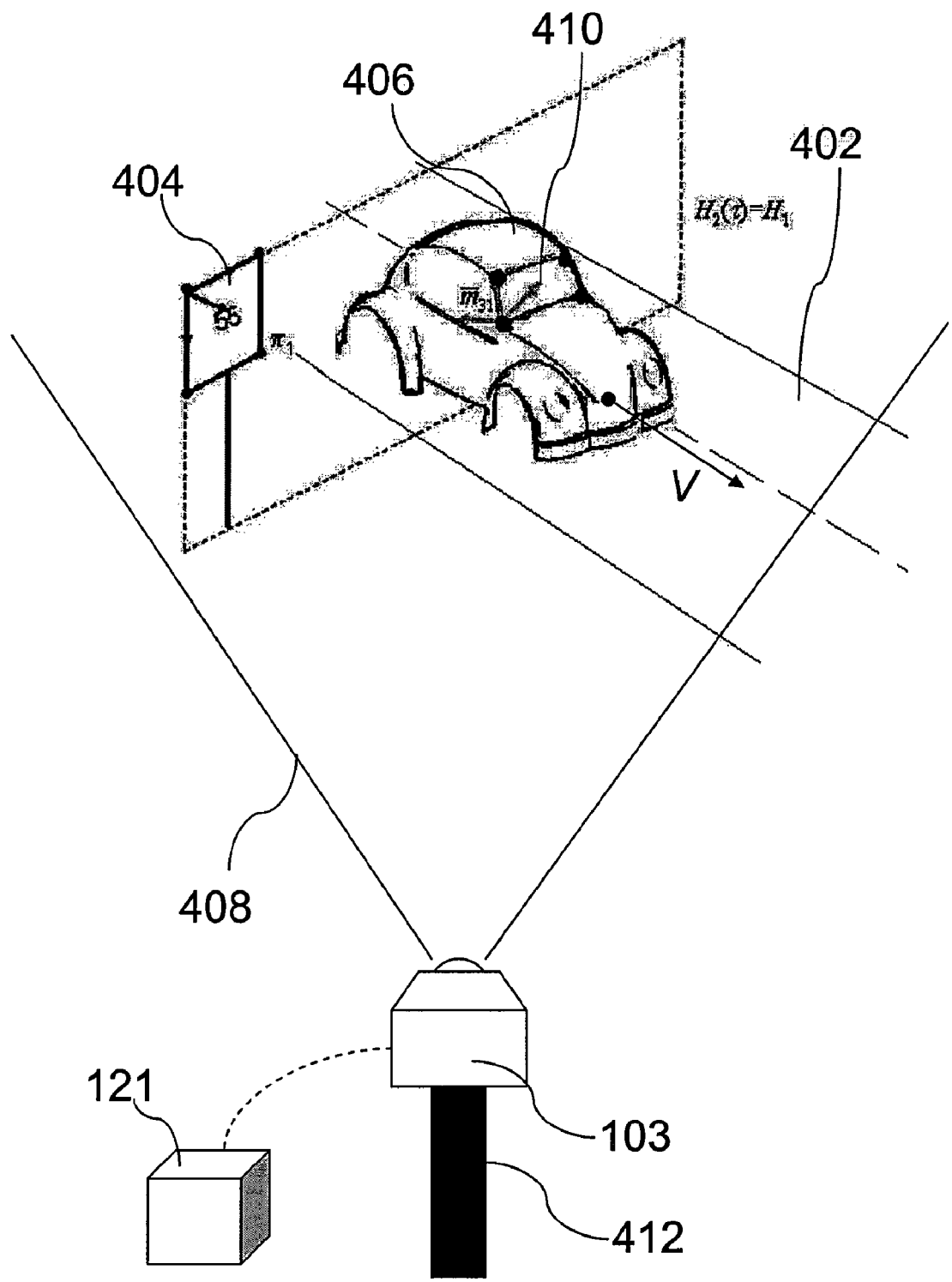
FIG. 4 depicts an exemplary arrangement for passively determining motor vehicle speed according to an embodiment of the present invention.

In the embodiments of the present invention, as shown in FIG. 4, a camera 103 configured to cooperatively operate with a processor 121, as previously described, can view the vehicle pathway 402 from a fixed position. A geometric length on the fixed object 404 near the vehicle pathway 402, such as a street sign, can be used. In embodiments using street signs or other traffic devices and markers, the dimensions of such objects are typically well-known and standardized and therefore do not require any additional measurement of these object, allowing the methods described herein to be immediately applied for monitor motor vehicle speeds. In an exemplary embodiment of the invention using a street sign as the fixed object 404, one can associate a plane $\pi_1$, as shown in FIG. 4, with the associated geometric variables $R^*_1$, $x^*_1$, $d^*_1$, and $n^*_1$. As previously noted, four or more points are needed to estimate the distance of the known planar object. Given k points on the known target, the location of the sign can be determined through the methods previously described above. These k points can define a homography $H_1$.

Assuming that the vehicle 404 is in the field of view 408 of the single camera 103 and that the four coplanar points 410 are visible and tracked on the vehicle 406, such as the corners of the windshield or a license plate, the tracked points 406 can be assumed to lie in a plane $\pi_2$ and have unknown coordinates $\overline{m}_{2j}$ in the world, and known coordinates $m_{2j}$ in the image. As the vehicle 406 passes the street sign 404, at some time $\tau$ the point $\overline{m}_{21}$ will lie in the plane $\pi_1$ and one can solve for the coordinates of this point using equation:

$$\overline{m}_{21} = z_j m_{21} = \frac{d^*_1}{n^*_1 \cdot m_{21}} m_{21}$$

One can then set the reference image for $\pi_2$ as $m^*_{2j} = m_{2j}(\tau)$. At some time $t = \tau + \delta$, $\delta > 0$, the Homography $H_2$ from $m^*_{2j}$ and $m_{2j}(\tau)$ can then be solved. $H_2$ can then be decomposed to get $n^*_2$, and then to solve for $d^*_2 = n^*_2 \cdot \overline{m}^*_{21}$, and all remaining points:

$$\overline{m}^*_{2j} = \frac{d^*_2}{n^*_2 \cdot m^*_{2j}} m^*_{2j}$$

Knowledge of all points $\overline{m}^*_{2j}$ can then allow for the geometric length between any two points to be solved and assigned as previously discussed.

However, a problem remains in detecting the time $\tau$ at which the point $\overline{m}_{21}$ lies in the plane $\pi_1$. The tracked point $m_{2j}$ can be used, along with the k points on the known target to solve the set of equations of a second homography matrix $\hat{H}_1$. Since the point on the vehicle will not generally be coplanar with the point of $\pi_1$, $\hat{H}_1$ will generally not be a proper homography and cannot be decomposed into the correct motion elements using typical epipolar methods. However, according to an embodiment of the present invention, a matrix $\hat{H}_1$, can be solved for.

In embodiments of the present invention, as the tracked points 410 on the moving vehicle 406 approaches the street sign 404, the values of $\hat{H}_1$ also approach the values of $H_1$. Accordingly, as the moving vehicle 406 passes the street sign 404, will be coplanar with $\pi_1$ and $\hat{H}_1(\tau) = H_1$. At this point, the distance to the point on the moving vehicle 406 is known since the distance to the sign 404 is known. With the distance to one point on the moving vehicle 406 known, the distance to all other tracked points 410 on the moving vehicle 406 can also be determined and the geometric length between any and all tracked points 410 on the moving vehicle 406 can be determined as well.

Once the geometric length of the moving vehicle 406 is provided, the method disclosed in the paper by Chitrakaran et al. can be used to identify the speed of the moving vehicle 406. As previously described, Chitrakaran et al. provides a nonlinear estimator to estimate the linear and angular velocity of a planar target given a series of images such as from a video stream. This method requires a priori knowledge of the initial pose of the object and knowledge of a single geometric length. This data, along with feature points extracted from the images can be input into a nonlinear estimation algorithm, based on homography, epipolar geometry, and sliding mode observer design, which can produce the velocity estimate.

However, other methods may be used to estimate velocity according to embodiments of the present invention including the "Continuous Euclidean Homography", which is similar to the Euclidean homography described above. However, Continuous Euclidean Homography gives the linear and angular velocity when decomposed, rather than the rotation and translation. However, it still requires knowledge equivalent to the geometric length needed by Chitrakaran et al. It does not require numerous images (i.e. video stream) like Chitrakaran et al. A second alternative is simply to use backwards differencing. That is, estimate the position at time $t_1$ (such as by the method described above), minus the position at time $t_2$ and divide by the total time. This gives an estimate of the average velocity. Other potential methods such as the use of a Kalman filter, neural network, or fuzzy estimation method may also provide estimates.

Embodiments of the present invention can also include filtering the velocity estimation signal, including any linear or nonlinear filtering of the velocity. Furthermore, such filtering can be accomplished using digital or analog filtering techniques. In some embodiments, the pose and velocity estimates can also be leveraged together in an optimal state estimation filter such as, but not limited to, a Kalman filter, or a particle filter.

Systems according to the invention can be mounted on a variety of fixed structures 412, such as on bridges or light poles, or signs located proximate to highways. Systems according to the invention can also be mounted in/on automobiles. Systems can include structure for wireless transmission of image data. The wireless arrangement permits a single computer to be associated with a plurality of spaced apart cameras. In one embodiment, the system includes one camera for measuring vehicle velocity and another camera for obtaining the license plate information of the vehicle. Power for the system can come from a battery, power company, or in one embodiment solar panels, particularly in the case of pole-mounted installations.

A significant advantage of the present invention is that two or more images from a single camera can identify multiple speeders. In contrast, conventional radar-based systems can only identify a single vehicle.

In embodiments of the present invention, a calibration is generally performed. A first stage of calibration can include adjusting parameters of the camera, known as intrinsic calibration, and generally only needs to be performed once when the camera is first acquired. An infrequent recalibration may be necessary. Such calibration can requires the use of a designed target, often a checkerboard type pattern, and software to interpret the results. Parameters that can be calibrated include, but are not limited to, focal length, principal point, skew coefficients, and distortion. In such calibrations, a camera model is used to judge the performance of the camera and to determine if any adjustments are required.

A second stage of calibration can involve determining the camera's place in the world, and is known as extrinsic calibration. In locations where the camera is placed in a location in which the dimension of the fixed object are known, the calibration is not necessary, as the dimensions can be provided directly to the processor. However, in cases where the dimensions are unknown, a calibration can be required every time a camera is placed in a new location. In essence, this extrinsic calibration can be used determining the size and distance of a known fixed objects such as a street signs, which are then used to determine the geometric lengths on moving vehicle. In some cases, this can be done periodically even if the camera is not moved, to ensure speed measurements are accurate. A calibration can occur by acquiring images of fixed objects as the camera be moved a known distance (such as on a sliding track) or zooming the lens a known distance. With this known length, the lengths of fixed objects can be determined, which can be used to determine the geometric lengths on moving objects.

In operation, the camera can be held still, or held still relative to a moving vehicle, such as a police vehicle. The system operator can initiate image gathering by pushing a button or pulling a trigger, or by touching a touch sensitive screen. The camera can remain still and gather at least a second image having the vehicle(s) of interest in the second image. Since the vehicles of interest are in the camera's field of view for at least several seconds, the camera can remain stationary. The extrinsic calibration data can then used to estimate the position of a known object in the scene, relative to the camera, and the intersection of the known object plane. When the vehicle passes the plane of intersection, an estimate of the distance to the vehicle is provided which is used to estimate a geometric length needed for the speed estimates.

The invention is expected to find widespread use in police vehicles for motorist speed detection. More generally, the invention can be used in more general scenarios, including scenarios including systems with the objective of simultaneously controlling the pose of a moving camera while viewing and controlling one or more moving targets, such as mobile robots. It should be understood that the invention described herein has much broader application, and in fact may be used to detect the range to a stationary object, the total velocity of any moving object and/or relative motion between moving or stationary objects. For example, the invention may be incorporated into a range and velocity detection system for moving vehicles. Another example is that the invention may be incorporated in a robotics manufacturing or monitoring system for monitoring or operating upon objects moving along an assembly line. Still another important application is a ranging device used in conjunction with a weapons system for acquiring and tracking a target. Yet another application is a spotting system used to detect camouflaged objects that may be in motion against a static background. Other possible uses and applications will be apparent to those skilled in the art.

This invention has been described herein in considerable detail to provide those skilled in the art with information relevant to apply the novel principles and to construct and use such specialized components as are required. However, it is to be understood that the invention can be carried out using different equipment, materials and devices, and that various modifications, both as to the equipment and operating procedures, can be accomplished without departing from the scope of the invention itself. Other modifications to the invention as described above are within the scope of the claimed invention.

Figure 5:
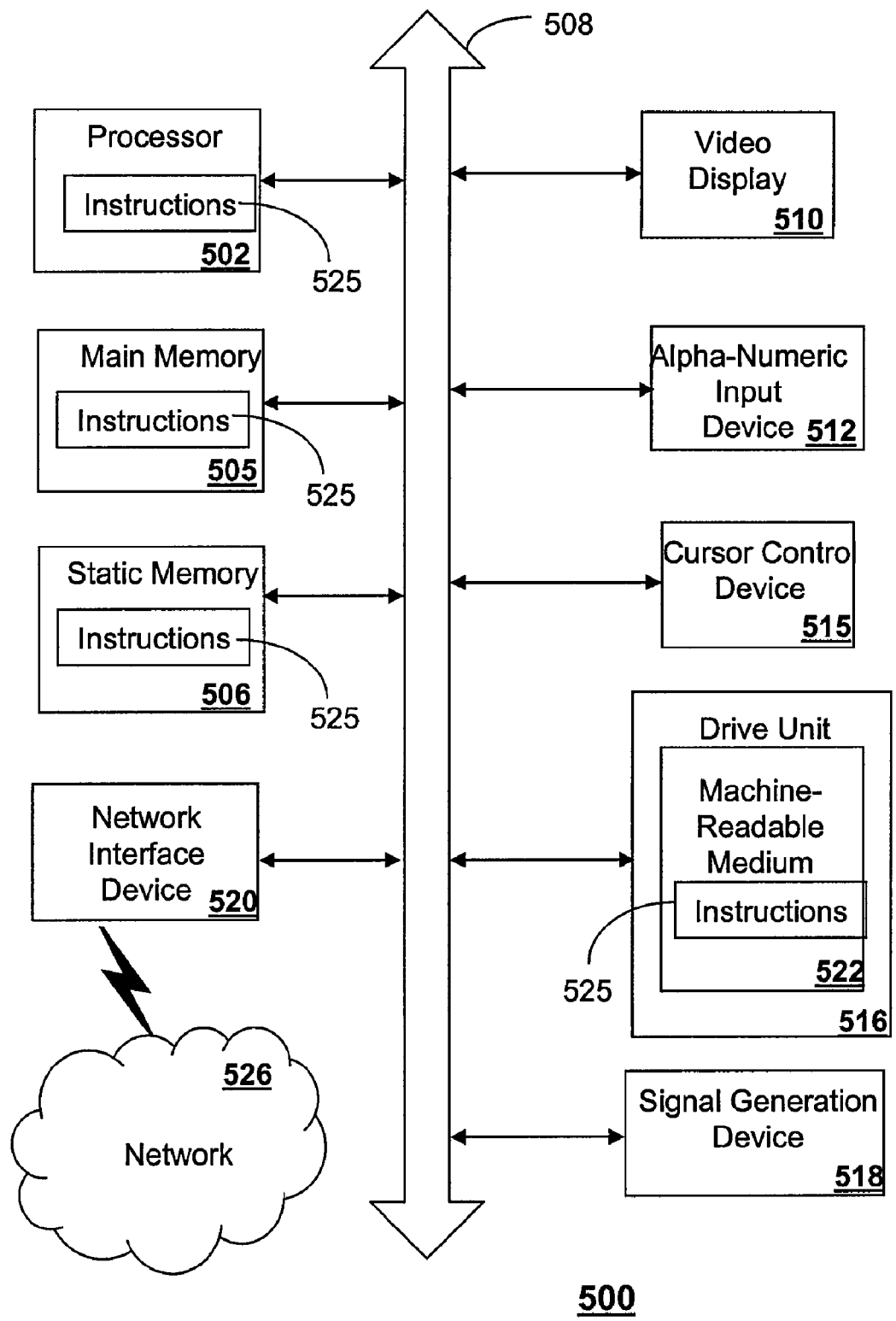
FIG. 5 is a schematic view of a computer system within which a set of instructions operate according to an embodiment of the invention.

FIG. 5 is a schematic diagram of a computer system 500 for executing a set of instructions that, when executed, can cause the computer system to perform one or more of the methodologies and procedures described above. In some embodiments, the computer system 500 operates as a standalone device. In other embodiments, the computer system 500 can be connected (for example, using a network) to other computing devices. In a networked deployment, the computer system 500 can operate in the capacity of a server or a client developer machine in server-client developer network environment, or as a peer machine in a peer-to-peer (or distributed) network environment.

The machine can comprise various types of computing systems and devices, including a server computer, a client developer computer, a personal computer (PC), a tablet PC, a laptop computer, a desktop computer, a control system, a network router, switch or bridge, or any other device capable of executing a set of instructions (sequential or otherwise) that specify actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 500 can include a processor 502 (such as a central processing unit (CPU), a graphics processing unit (GPU, or both), a main memory 504 and a static memory 506, which communicate with each other via a bus 508. The computer system 500 can further include a display unit 510 such as a video display (e.g., a liquid crystal display or LCD), a flat panel, a solid state display, or a cathode ray tube (CRT)). The computer system 500 can include an input device 512 (e.g., a keyboard), a cursor control device 514

(e.g., a mouse), a disk drive unit 516, a signal generation device 518 (e.g., a speaker or remote control) and a network interface device 520.

The disk drive unit 516 can include a computer-readable storage medium 522 on which is stored one or more sets of instructions 524 (for example, software code) configured to implement one or more of the methodologies, procedures, or functions described herein, including those methods illustrated above. The instructions 524 can also reside, completely or at least partially, within the main memory 504, the static memory 506, and/or within the processor 502 during execution thereof by the computer system 500. The main memory 504 and the processor 502 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 524 or that receives and executes instructions 524 from a propagated signal so that a device connected to a network environment 526 can send or receive voice and/or video data, and that can communicate over the network 526 using the instructions 524. The instructions 524 can further be transmitted or received over a network 526 via the network interface device 520.

While the computer-readable storage medium 522 is shown in an exemplary embodiment to be a single storage medium, the term "computer-readable storage medium" should be taken to include a single medium or multiple media (for example, a centralized or distributed database, and/or associated caches and servers) that store the one or more sets of instructions. The term "computer-readable storage medium" shall also be taken to include any medium that is capable of storing, encoding or carrying out a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for passively determining a speed of moving vehicles, comprising:
   an imaging device for acquiring images of a moving vehicle on a vehicle pathway and a fixed object proximate to the moving vehicle, the fixed object defining a first plane that intersects an adjacent portion of the vehicle pathway, wherein no geometric length of the vehicle is known a priori; and
   a processor operable to receive data associated with the images and determine a speed of the moving vehicle in the images, wherein the processor estimates a geometric length of the vehicle based on applying homography using the images, and wherein the processor determines a speed of the moving vehicle from the images and the estimated geometric length using a velocity estimation method.

2. The system of claim 1, wherein the processor is remotely located from the imaging device.

3. The system of claim 2, further comprising a removable memory element for storing said images acquired by said imaging device, and wherein said processor is operable to retrieve said images from said removable memory element.

4. The system of claim 2, wherein the imaging device is communicatively coupled to the processor, wherein the system includes a transceiver operable to transmit the data associated with the images from the imaging device to the processor.

5. The system of claim 1, wherein said imaging device is an infrared imaging device.

6. The system of claim 1, further comprising a second imaging device for recording license plate information associated with the vehicle.

7. The system of claim 1, wherein the homography is based on a geometric length of the fixed object.

8. The system of claim 7, wherein the geometric length of the fixed object is determined by homography using images acquired by the camera from different positions.

9. A method for passively determining a speed of moving vehicles, comprising:
acquiring images of a moving vehicle on a vehicle pathway and a fixed object proximate to the moving vehicle that defines a first plane which intersects an adjacent portion of the vehicle pathway, wherein no geometric length of the vehicle is known a priori;
estimating a geometric length of the vehicle based on applying homography using the images of the vehicle; and
determining a speed of the moving vehicle from the images and the geometric length using a velocity estimation method.

10. The method of claim 9, wherein a location of the imaging device is different from a location for processing the images.

11. The method of claim 10, wherein said acquiring step further comprises storing said images in a removable memory element at said location of said imaging device, the method further comprising: prior to said estimating step, moving said memory element to said processing location and retrieving said images from said memory element.

12. The method of claim 10, further comprising: prior to said estimating step, transmitting said images to said processing location using at least one among a wireless and a wireline transmission.

13. The method of claim 9, wherein said imaging device comprises an infrared imaging device.

14. The method of claim 9, further comprising: recording license plate information associated with the vehicle.

15. The method of claim 9, wherein the homography is based on a geometric length of the fixed object.

16. The method of claim 15, wherein the geometric length of the fixed object is determined by homography using a images acquired by the camera from different positions.

17. The system of claim 7, wherein the processor calculates the homography by tracking matching feature points associated with the vehicle between the images.

18. The system of claim 17, wherein the processor estimates distances from the fixed object to the feature points based upon the geometric length of the fixed object.

19. The system of claim 18, wherein the processor estimates the geometric length of the vehicle based upon the estimated distances.

20. The method of claim 15, further comprising calculating the homography by tracking matching feature points associated with the vehicle between the images.

21. The method of claim 20, further comprising estimating distances from the fixed object to the feature points based upon the geometric length of the fixed object.

22. The method of claim 21, wherein estimating the geometric length of the vehicle comprises estimating the geometric length based upon the estimated distances.

* * * * *

UNITED STATES PATENT AND TRADEMARK OFFICE
CERTIFICATE OF CORRECTION

PATENT NO.         : 8,401,240 B2                              Page 1 of 1
APPLICATION NO.    : 12/447782
DATED              : March 19, 2013
INVENTOR(S)        : Warren E. Dixon, Nicholas R. Gans and Sumit Gupta It is certified that error appears in the above-identified patent and that said Letters Patent is hereby corrected as shown below:

In the Specification:

The Sponsorship Clause should be added as follows:

In column 1, on line 15, please insert the following:

--STATEMENT REGARDING FEDERALLY SPONSORED RESEARCH OR DEVELOPMENT

This research was supported in part by US NSF Grant DMI-9457967, ONR Grant NOOO 14-99-1-0589, a DOC Grant and an ARO Automotive Center Grant at Clemson University, and in part by AFOSR Contract No.: F49620-03-1-0381 at the University of Florida. The government has certain rights in this invention.--

Signed and Sealed this
Twenty-ninth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,401,240 B2  Page 1 of 1
APPLICATION NO. : 12/447782
DATED : March 19, 2013
INVENTOR(S) : Dixon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this
First Day of September, 2015

Michelle K. Lee
*Director of the United States Patent and Trademark Office*